US009654291B2

(12) United States Patent
Toyoizumi et al.

(10) Patent No.: US 9,654,291 B2
(45) Date of Patent: May 16, 2017

(54) AUTHENTICATION SERVER, AUTHENTICATION SYSTEM, AUTHENTICATION METHOD, AND PROGRAM

(71) Applicant: A. T Communications Co., Ltd., Tokyo (JP)

(72) Inventors: Hiroshi Toyoizumi, Tokyo (JP); Youichi Azuma, Tokyo (JP)

(73) Assignee: A.T Communications Co., Ltd., Tokyo (JP)

( * ) Notice: Subject to any disclaimer, the term of this patent is extended or adjusted under 35 U.S.C. 154(b) by 0 days.

(21) Appl. No.: 14/773,718

(22) PCT Filed: Jul. 3, 2013

(86) PCT No.: PCT/JP2013/068295
§ 371 (c)(1),
(2) Date: Sep. 8, 2015

(87) PCT Pub. No.: WO2015/001637
PCT Pub. Date: Jan. 8, 2015

(65) Prior Publication Data
US 2016/0036589 A1    Feb. 4, 2016

(51) Int. Cl.
*H04L 9/32* (2006.01)
*G06F 21/44* (2013.01)
(Continued)

(52) U.S. Cl.
CPC ............ *H04L 9/3226* (2013.01); *G06F 21/31* (2013.01); *G06F 21/33* (2013.01); *G06F 21/44* (2013.01);
(Continued)

(58) Field of Classification Search
CPC ....................................................... H04L 9/32
See application file for complete search history.

(56) References Cited

U.S. PATENT DOCUMENTS 5,726,435 A    3/1998  Hara et al.
2005/0229009 A1*  10/2005 Fujii ..................... H04L 9/08
                                                    713/186
(Continued)

FOREIGN PATENT DOCUMENTS

CN       1885311 A    12/2006
CN    101546386 A     9/2009
(Continued)

OTHER PUBLICATIONS

First Office Action dated May 26, 2016 for Chinese Patent Application 201380064599.9 (Original and English Translation provided).
(Continued)

*Primary Examiner* — Josnel Jeudy
(74) *Attorney, Agent, or Firm* — K&L Gates LLP; Louis C. Cullman; Robert W. Winn (57) ABSTRACT

In an authentication system, a mobile communication client transmits to an authentication server a bit signal that includes an image capture bit sequence obtained by capturing an image of a self-aware two-dimensional code having authentication information embedded in a correction area, and a number bit sequence that indicates a serial number of an authentication application program being stored in storage. The authentication server authenticates the user of the mobile communication client and the self-aware two-dimensional code. Subsequently, the authentication server transmits designated information expressed by the self-aware two-dimensional code to the mobile communication client, on the condition that the user and the self-aware two-dimensional code are successfully authenticated. Consequently, the mobile communication client is able to acquire the designated information expressed by the self-aware two-dimensional code.

8 Claims, 6 Drawing Sheets

(51) Int. Cl.
  *G09C 1/00* (2006.01)
  *G09C 5/00* (2006.01)
  *G06F 21/33* (2013.01)
  *G06F 21/31* (2013.01)
  *H04L 29/06* (2006.01)

(52) U.S. Cl.
  CPC ............... *G09C 1/00* (2013.01); *G09C 5/00* (2013.01); *H04L 63/083* (2013.01); *H04L 63/1441* (2013.01); *H04L 63/0442* (2013.01)

(56) References Cited

U.S. PATENT DOCUMENTS

| | | | |
|---|---|---|---|
| 2007/0192850 A1* | 8/2007 | Cowburn | G06K 7/10762 726/20 |
| 2008/0211670 A1* | 9/2008 | Gordon | G06F 21/88 340/572.1 |
| 2009/0212111 A1* | 8/2009 | Krichi | G06K 7/14 235/462.11 |
| 2011/0047214 A1* | 2/2011 | Lee | H04L 12/2809 709/204 |

FOREIGN PATENT DOCUMENTS

| | | |
|---|---|---|
| CN | 102163291 A | 8/2011 |
| CN | 103049779 A | 4/2013 |
| EP | 0672994 A1 | 9/1995 |
| EP | 1862939 | 12/2007 |
| EP | 2105868 | 9/2009 |
| JP | 07-254037 | 3/1995 |
| JP | 2938338 | 8/1999 |
| JP | 2006-053851 | 2/2006 |
| JP | 2008-234530 | 10/2008 |
| JP | 2011-028314 | 10/2011 |
| JP | 2012-181645 | 9/2012 |

OTHER PUBLICATIONS

Supplemental European Search Report for European Application 13888850.8 filed on Oct. 12, 2015.

International Search Report, PCT/JP2013/068295, dated Oct. 15, 2013.

* cited by examiner

AUTHENTICATION SERVER, AUTHENTICATION SYSTEM, AUTHENTICATION METHOD, AND PROGRAM

TECHNICAL FIELD

The present invention relates to an authentication server, an authentication system, an authentication method, and a program, and more particularly, to an authentication server, an authentication system, an authentication method, and a program able to detect forgery of a two-dimensional code.

BACKGROUND

As a technology for easily acquiring designated information, two-dimensional codes such as Quick Response (QR) Codes (registered trademark) are being utilized in various fields. Particularly, the information delivery system disclosed in Patent Literature 1 below, for example, is known as a means of guiding a consumer using a mobile communication client such as a mobile phone or smartphone to a desired website, such as a website featuring commercial advertising. Note that the entirety of the specification, claims, and drawings of Patent Literature 1 are hereby incorporated by reference.

SUMMARY

Technical Problem

In this system, it is possible to acquire a Uniform Resource Locator (URL) by reading a two-dimensional code encoding the URL of a target website with a mobile communication client. Such a method is widely prevalent, and correspondingly, respective mobile communication clients are configured such that a program (application) for optically reading a two-dimensional code is preinstalled or installable via the Internet or the like, thereby resulting in an environment in which anyone may possess a reader capable of reading a two-dimensional code.

Meanwhile, in the case in which a URL acquired by reading a two-dimensional code is fraudulently altered or the like, the mobile communication client will be connected to a website different from the desired website, unless there exists a method of checking whether or not the URL is safe. In this case, if the mobile communication client is connected to a malicious website harboring a virus or malware or the like, there is a problem in that the mobile communication client may become infected with a virus or malware and become damaged.

Such a problem is not limited to URLs. In the case of reading a two-dimensional code whose information has been fraudulently altered, or in other words, in the case of two-dimensional code-related fraud, there is a problem in that damage caused by reading a fraudulent two-dimensional code may occur unless there exists a method of checking that fraud.

The present invention has been devised in order to solve the above problem, and an object thereof is to provide an authentication server, an authentication system, an authentication method, and a program able to detect forgery of a two-dimensional code.

Solution to Problem

In order to achieve the above object, an authentication server according to a first aspect of the present invention is connected via a network to a communication client that generates a bit signal by capturing an image of a two-dimensional code, the two-dimensional code being provided with an information area that expresses designated information with a cell distribution pattern, and a correction area that expresses correction information for correcting errors with a cell distribution pattern, wherein one part of the correction area is substituted with the exclusive OR of a first correction bit sequence generated from the one part, and a second correction bit sequence generated from a part different from the one part of the correction area, the authentication server comprising:

bit signal receiving means that receives the bit signal transmitted from the communication client via the network;

decoding means that decodes the bit signal received by the bit signal receiving means to acquire the designated information and the correction information;

error detecting means that uses the correction information acquired by the decoding means to detect the exclusive OR of the first correction bit sequence and the second correction bit sequence as error;

two-dimensional code authenticating means that authenticates the two-dimensional code by determining whether or not the exclusive OR of the first correction bit sequence included in the correction information and the error detected by the error detecting means matches the second correction bit sequence included in the correction information; and information transmitting means that, when the two-dimensional code authenticating means obtains an authentication result of both matching, transmits the designated information acquired by the decoding means to the communication client via the network.

The above authentication server may also be configured such that the bit signal receiving means receives the bit signal of the two-dimensional code having one part of the correction area substituted with the exclusive OR of the first correction bit sequence and an encrypted bit sequence obtained by encrypting the second correction bit sequence, and the two-dimensional code authenticating means authenticates the two-dimensional code by determining whether or not a decrypted bit sequence, obtained by decrypting the exclusive OR of the first correction bit sequence included in the correction information and the error detected by the error detecting means according to a scheme corresponding to the encryption, matches the second correction bit sequence included in the correction information.

The above authentication server may also be configured such that the bit signal receiving means receives the bit signal of the two-dimensional code having one part of the correction area substituted with the exclusive OR of the first correction bit sequence and an encrypted bit sequence obtained by encrypting the second correction bit sequence according to an asymmetrical encryption scheme, and the two-dimensional code authenticating means authenticates the two-dimensional code by determining whether or not a decrypted bit sequence, obtained by decrypting the exclusive OR of the first correction bit sequence included in the correction information and the error detected by the error detecting means according to a scheme corresponding to the asymmetrical encryption scheme, matches the second correction bit sequence included in the correction information.

The above authentication server may also be configured such that the bit signal receiving means receives the bit signal of the two-dimensional code having one part of the correction area substituted with the exclusive OR of the first correction bit sequence and an encrypted bit sequence obtained by encrypting the second correction bit sequence according to an elliptic curve encryption scheme, and the two-dimensional code authenticating means authenticates the two-dimensional code by determining whether or not a decrypted bit sequence, obtained by decrypting the exclusive OR of the first correction bit sequence included in the correction information and the error detected by the error detecting means according to a scheme corresponding to the elliptic curve encryption scheme, matches the second correction bit sequence included in the correction information.

The above authentication server may also additionally comprise:

identification information registering means that registers identification information able to specify a user of the communication client; and user authenticating means that authenticates the user by determining whether or not the identification information registering means has registered a match with the identification information included in the bit signal and transmitted from the communication client;

wherein the information transmitting means transmits the designated information acquired by the decoding means to the communication client via the network when the two-dimensional code authenticating means obtains an authentication result of both matching, and in addition the user authenticating means obtains an authentication result of identification information being registered.

In order to achieve the above object, an authentication system according to a second aspect of the present invention comprises:

the above authentication server; and the communication client connected to the authentication server via the network;

wherein the communication client includes bit signal generating means that generates the bit signal by capturing an image of the two-dimensional code, bit signal transmitting means that transmits the bit signal generated by the bit signal generating means to the authentication server via the network, and information receiving means that, by receiving the designated information transmitted by the information transmitting means, acquires the designated information expressed by the two-dimensional code.

In order to achieve the above object, an authentication method according to a third aspect of the present invention is an authentication method conducted by an authentication server connected via a network to a communication client that generates a bit signal by capturing an image of a two-dimensional code, the two-dimensional code being provided with an information area that expresses designated information with a cell distribution pattern, and a correction area that expresses correction information for correcting errors with a cell distribution pattern, wherein one part of the correction area is substituted with the exclusive OR of a first correction bit sequence generated from the one part, and a second correction bit sequence generated from a part different from the one part of the correction area, the authentication method comprising:

a bit signal receiving step that receives the bit signal transmitted from the communication client via the network;

a decoding step that decodes the bit signal received by the bit signal receiving step to acquire the designated information and the correction information;

an error detecting step that uses the correction information acquired by the decoding step to detect the exclusive OR of the first correction bit sequence and the second correction bit sequence as error;

a two-dimensional code authenticating step that authenticates the two-dimensional code by determining whether or not the exclusive OR of the first correction bit sequence included in the correction information and the error detected by the error detecting step matches the second correction bit sequence included in the correction information; and an information transmitting step that, when the two-dimensional code authenticating step obtains an authentication result of both matching, transmits the designated information acquired by the decoding step to the communication client via the network.

In order to achieve the above object, a program according to a fourth aspect of the present invention is for a computer of an authentication server connected via a network to a communication client that generates a bit signal by capturing an image of a two-dimensional code, the two-dimensional code being provided with an information area that expresses designated information with a cell distribution pattern, and a correction area that expresses correction information for correcting errors with a cell distribution pattern, wherein one part of the correction area is substituted with the exclusive OR of a first correction bit sequence generated from the one part, and a second correction bit sequence generated from a part different from the one part of the correction area, the program causing the computer to execute:

a bit signal receiving procedure that receives the bit signal transmitted from the communication client via the network;

a decoding procedure that decodes the bit signal received by the bit signal receiving procedure to acquire the designated information and the correction information;

an error detecting procedure that uses the correction information acquired by the decoding procedure to detect the exclusive OR of the first correction bit sequence and the second correction bit sequence as error;

a two-dimensional code authenticating procedure that authenticates the two-dimensional code by determining whether or not the exclusive OR of the first correction bit sequence included in the correction information and the error detected by the error detecting procedure matches the second correction bit sequence included in the correction information; and an information transmitting procedure that, when the two-dimensional code authenticating procedure obtains an authentication result of both matching, transmits the designated information acquired by the decoding procedure to the communication client via the network.

Advantageous Effects

According to the present invention, it is possible to provide an authentication server, an authentication system, an authentication method, and a program able to detect forgery of a two-dimensional code.

DETAILED DESCRIPTION

Hereinafter, an authentication system according to an embodiment of the present invention will be described with reference to the drawings.

Figure 1:
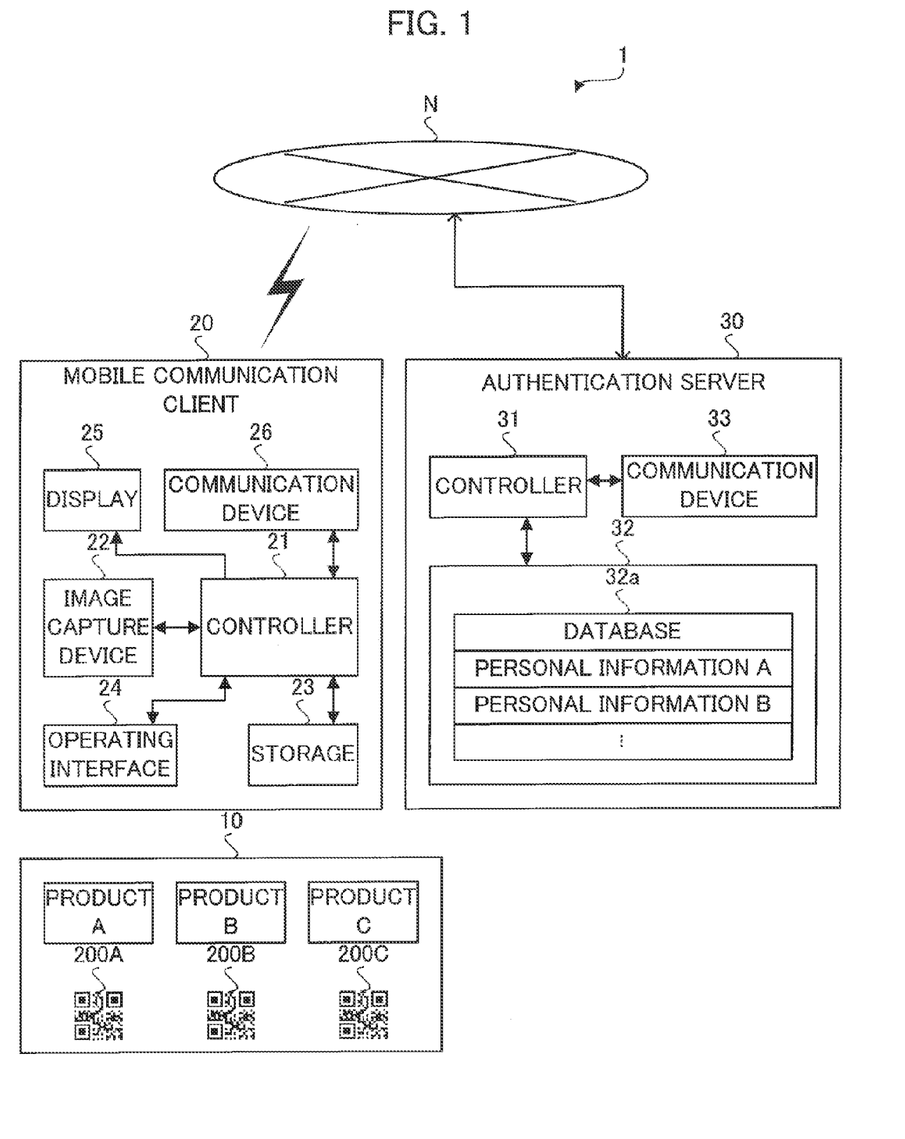
FIG. 1 is a block diagram illustrating an exemplary configuration of an authentication system.

FIG. 1 is a diagram illustrating an exemplary configuration of the authentication system according to the embodiment. As illustrated in FIG. 1, an authentication system 1 is equipped with a virtual vending machine 10, a mobile communication client 20, and an authentication server 30.

The virtual vending machine 10 comprises a poster, internally lighted panel or the like, and displays product information capable of specifying a product (such as the product A, the product B and the product C in the example illustrated in FIG. 1) in association with self-aware two-dimensional codes 200 having authentication information embedded into an embed target two-dimensional code 100 (the self-aware two-dimensional codes 200A, 200B and 200C in the example illustrated in FIG. 1).

Note that the virtual vending machine 10 is arbitrary insofar as product information and self-aware two-dimensional codes 200 are displayable in association with each other. For example, the virtual vending machine 10 may also comprise a paper medium, metal, plastic, vinyl, rubber, cloth or the like. Specifically, in the case in which the virtual vending machine 10 is a poster comprising a paper medium, it is sufficient to print product information and self-aware two-dimensional codes 200 onto the paper medium. Also, in the case in which the virtual vending machine 10 comprises cloth, it is sufficient to display product information and self-aware two-dimensional codes 200 via stitching or the like. In the case in which the virtual vending machine 10 comprises metal or plastic, it is sufficient to display product information and self-aware two-dimensional codes 200 by forming depressions, holes or the like pressed into the surface.

In the present embodiment, the self-aware two-dimensional codes 200A, 200B, and 200C express the Uniform Resource Locator (URL) of a purchase site for a product A, a product B and a product C, respectively.

Figure 2:
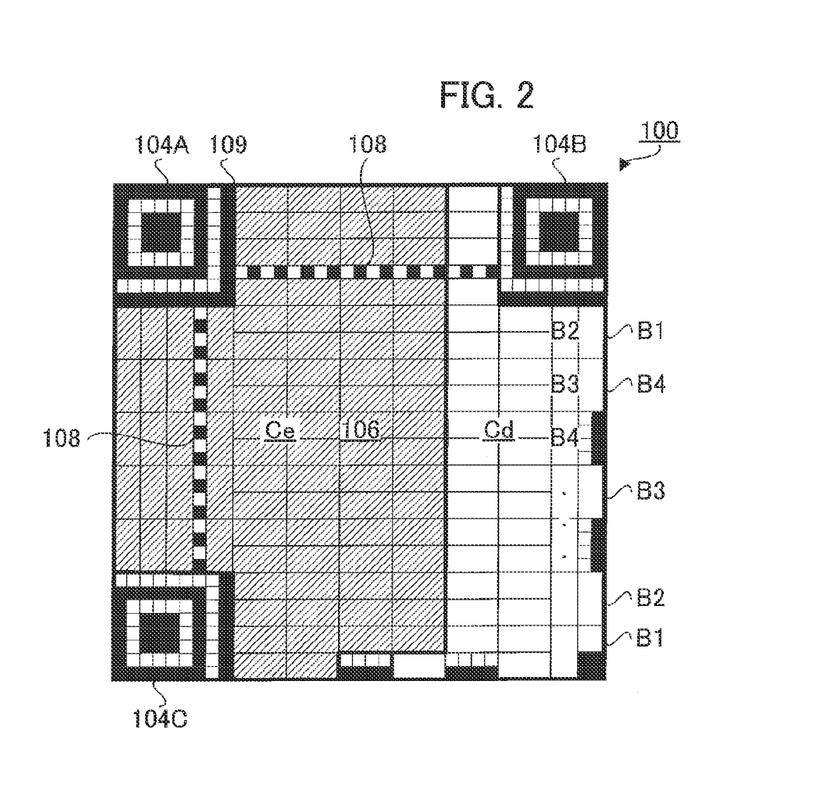
FIG. 2 is a diagram illustrating an exemplary configuration of a two-dimensional code.

FIG. 2 is a diagram illustrating an exemplary configuration of the embedded two-dimensional code according to the present embodiment.

The two-dimensional code 100 satisfies the standard (JIS X 0510) for what are called Quick Response (QR) Codes (registered trademark. The same applies hereafter.). As illustrated in FIG. 2, the two-dimensional code 100 is provided with three positioning symbols 104A, 104B and 104C, an information code recording area 106, timing cells 108, a format code 109 and the like.

The three positioning symbols 104A, 104B and 104C are respectively positioned at three vertices among the four vertices of the square-shaped two-dimensional code 100.

The timing cells 108 are arranged as a linear reference pattern combining alternating white and black cells between the positioning symbols 104A, 104B and 104C. These timing cells 108 are used as indicators of each data cell position.

The format code 109 is placed near the positioning symbol 104A, and indicates predefined version information regarding the format of the information code recorded within the information code recording area 106. Version information in the two-dimensional code (QR Code (registered trademark)) comprises versions from 1 to 40, with four error correction levels L, M, Q and H (increasing in order from L to H) for each version.

The versions 1 to 40 primarily correspond to the total number of symbols comprising eight cells corresponding to 8 bits. Also, the error correction levels (L, M, Q and H) correspond to how high is the allowed proportion of unreadable symbols from among all symbols, or in other words, how high is the allowed loss rate. The allowed loss rate for each level is approximately 30% for the error correction level H, approximately 25% for the error correction level Q, approximately 15% for the error correction level M, and approximately 7% for the error correction level L. In the present embodiment, the two-dimensional code 100 at version 5 with a total of 134 symbols at error correction level H is used, and this version information is expressed as "5-H". However, the present invention is not limited thereto. The version and error correction level of the two-dimensional code is arbitrary, and may be any of the versions from 1 to 40, while the error correction level may be any of L, M, Q and H.

The information code recording area 106 comprises two types of cells with different optical characteristics (excepting a black and white pattern), and includes a code pair of an information code (information area) Cd and a corresponding Reed-Solomon (RS) code (correction area) Ce. The information code Cd is an encoding of designated information, and expresses designated information via a distribution pattern of cells included in the information code Cd (a cell pattern). Meanwhile, the RS code Ce is an encoding of correction information in which the designated information is coded using Reed-Solomon (RS) codes, and expresses correction information for the purpose of correcting errors via a cell pattern included in the RS code.

Although the present embodiment exemplifies coding using RS codes as an ideal example, the present invention is not limited thereto, and another coding scheme is also acceptable. For example, BCH codes or the like are suitably applicable to the present invention. Also, Golay code, Hadamard code, Reed-Muller code, low-density parity-check code, Goppa code, Fire code, convolutional codes, turbo codes, a concatenated RS code with a cyclic Hamming code and the like are also applicable to the present invention.

The information code recording area 106 comprises 44 information symbols constituting the information code Cd and 90 RS symbols constituting the RS code Ce, for a total of 134 symbols. The information code recording area 106 is divided into four blocks B1 to B4. Of these, the two blocks B1 and B2 comprise 11 information symbols and the corresponding 22 RS symbols, for a total of 33 symbols. The remaining two blocks B3 and B4 comprise 11 information symbols and the corresponding 23 RS symbols, for a total of 34 symbols.

Figure 3:
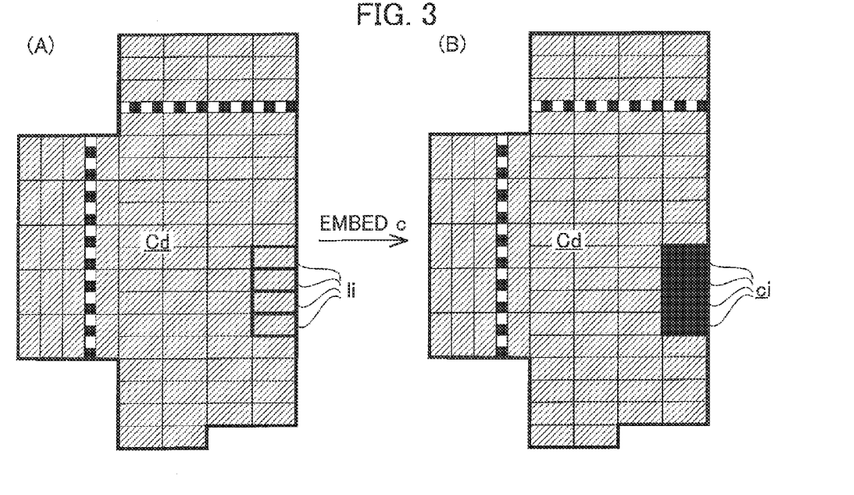
FIG. 3 is a schematic diagram for describing an authentication information embedding sequence.

Next, the schematic diagram illustrated in FIG. 3 will be used to describe a method of embedding authentication information into the correction area of the two-dimensional code 100 illustrated in FIG. 2, and generating the self-aware two-dimensional code 200.

First, by decoding each block of the two-dimensional code 100 in accordance with a designated code placement rule, an information bit sequence comprising 11 information symbols and an RS bit sequence comprising 22 or 23 RS symbols are acquired from each block.

Next, 12 RS symbols are extracted from predetermined positions in the RS bit sequence of each block. Subsequently, from among the 12 extracted RS symbols, 6 predetermined symbols are selected in all 4 blocks to acquire a bit sequence m with a bit length of 192 comprising a total of 24 RS symbols.

Additionally, the bit sequence m is encrypted using Elliptic Curve Cryptography (ECC) to acquire a bit sequence c. Elliptic curve cryptography depends on the mathematical difficulty of the Elliptic Curve Discrete Logarithm Problem (ECDLP), and is cryptographically strong because an algorithm that efficiently solves the ECDLP does not exist at this time. Also, with elliptic curve cryptography, the cryptographic strength of a 1024-bit RSA key length may be realized with just 160 bits, and the processing time is also short. For this reason, encrypting using elliptic curve cryptography is most preferable.

Note that although the present embodiment exemplifies encrypting a bit sequence using elliptic curve cryptography as an ideal example, the present invention is not limited thereto, and another encryption scheme is also acceptable. For example, asymmetric cryptography (public key cryptography) such as Rivest-Shamir-Adleman (RSA) encryption or ElGamal encryption is also suitably applicable to the present invention. Also, encryption such as the Advanced Encryption Standard (AES), the Data Encryption Standard (DES) and the like are also applicable to the present invention.

Subsequently, the bit sequence c is divided into four to match the number of blocks, and bit sequences ci (where i=1 to 4) are generated. Also, the exclusive OR is respectively computed between the bit sequences ci (where i=1 to 4) and bit sequences li (where i=1 to 4) comprising the remaining 6 symbols from the 12 RS symbols extracted from each block, thereby generating bit sequences $\underline{c}i$ (where i=1 to 4). In addition, as illustrated in FIGS. 3A and 3B, for example, the bit sequence c is embedded as authentication information by substituting the bit sequences li with the respective bit sequences $\underline{c}i$.

Subsequently, the self-aware two-dimensional code 200 with authentication information embedded into the correction area is generated by placing the information bit sequence and the RS bit sequence with embedded authentication information according to the placement rule of the original two-dimensional code 100.

Next, a configuration of the mobile communication client 20 illustrated in FIG. 1 will be described.

The mobile communication client 20 becomes able to perform a digitizing process by installing the authentication application program to be discussed later onto a device such as a mobile phone or smartphone that has a camera function, for example. The mobile communication client 20 is a client configured as an optical information reader capable of optically reading the self-aware two-dimensional code 200.

The mobile communication client 20 is equipped with a controller 21, an image capture device 22, storage 23, an operating interface 24, a display 25 and a communication device 26.

The controller 21 is capable of ordinary communication processes as a mobile phone, and is additionally capable of processing image data captured on the basis of a pixel signal from the image capture device 22 that has a camera function. The controller 21 mainly comprises a microcontroller, and includes components such as a Central Processing Unit (CPU), a system bus and an input/output interface. The controller 21, together with the storage 23, functions as an information processing device.

The storage 23 comprises established semiconductor memory or the like, such as Read Only Memory (ROM), Random Access Memory (RAM) and non-volatile memory. Designated programs for realizing the telephony functions and communication functions discussed earlier are stored in advance in the storage 23, and an authentication application program downloaded from the authentication server 30 is also stored. As a result, the mobile communication client 20 is configured as a device that digitizes the self-aware two-dimensional code 200 included in image data. In addition, a serial number of the authentication application program is stored in the storage 23.

The operating interface 24 comprises multiple keys or the like. The operating interface 24 has a function of inputting information according to key operations into the controller 21.

The display 25 comprises a liquid crystal display panel or the like. The display 25, under control by the controller 21, has a function of displaying information such as the URL of a product purchase site expressed by the self-aware two-dimensional code 200.

The communication device 26, under control by the controller 21, has a function of communicating with the authentication server 30 or the like via a network N such as the Internet.

Next, a configuration of the authentication server 30 will be described.

The authentication server 30 is a device that functions as a server able to communicate with one or multiple mobile communication clients 20 via the network N. The authentication server 30 is primarily equipped with a controller 31, storage 32 and a communication device 33.

The controller 31 centrally controls the storage 32 and the communication device 33. The controller 31 mainly comprises a microcontroller and includes components such as a CPU, a system bus and an input/output interface. The controller 31, together with the storage 32, functions as an information processing device.

The storage 32 comprises established semiconductor memory or the like, such as ROM, RAM and non-volatile memory. A database 32a and an application program for executing the authentication process discussed later are stored in advance in the storage 32. Download data for the authentication application program is also stored in the storage 32.

In the database 32a, serial numbers of the authentication application programs and personal information of the users of the mobile communication clients 20 that have downloaded the authentication application program are registered in association with each other. The personal information includes a user's name, address, email address and the like.

The communication device 33 enables communication via the network N and the like. The communication device 33, under control by the controller 31, has a function of communicating with one or multiple mobile communication clients 20 via the network N.

Figure 4:
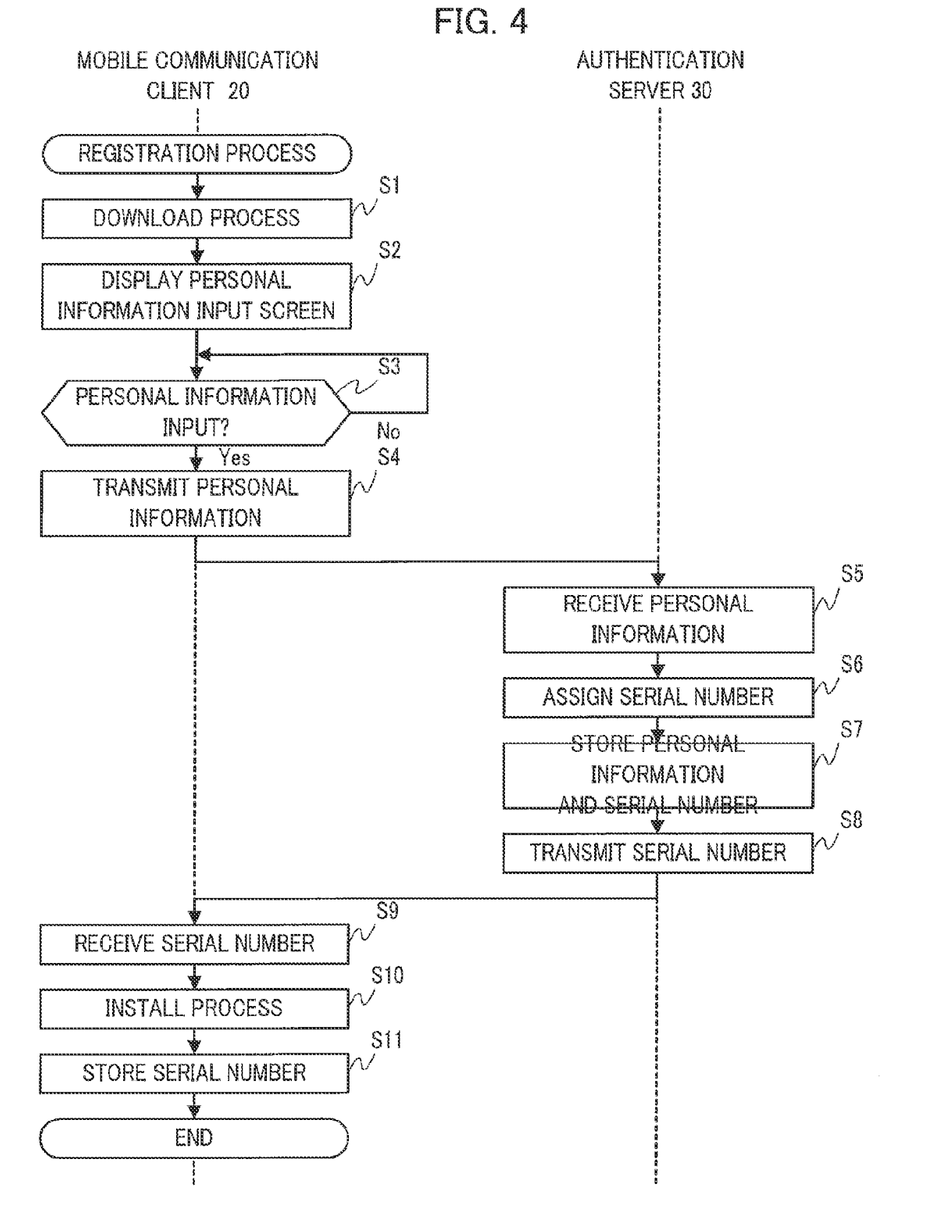
FIG. 4 is a flowchart illustrating details of a registration process.
Figure 5:
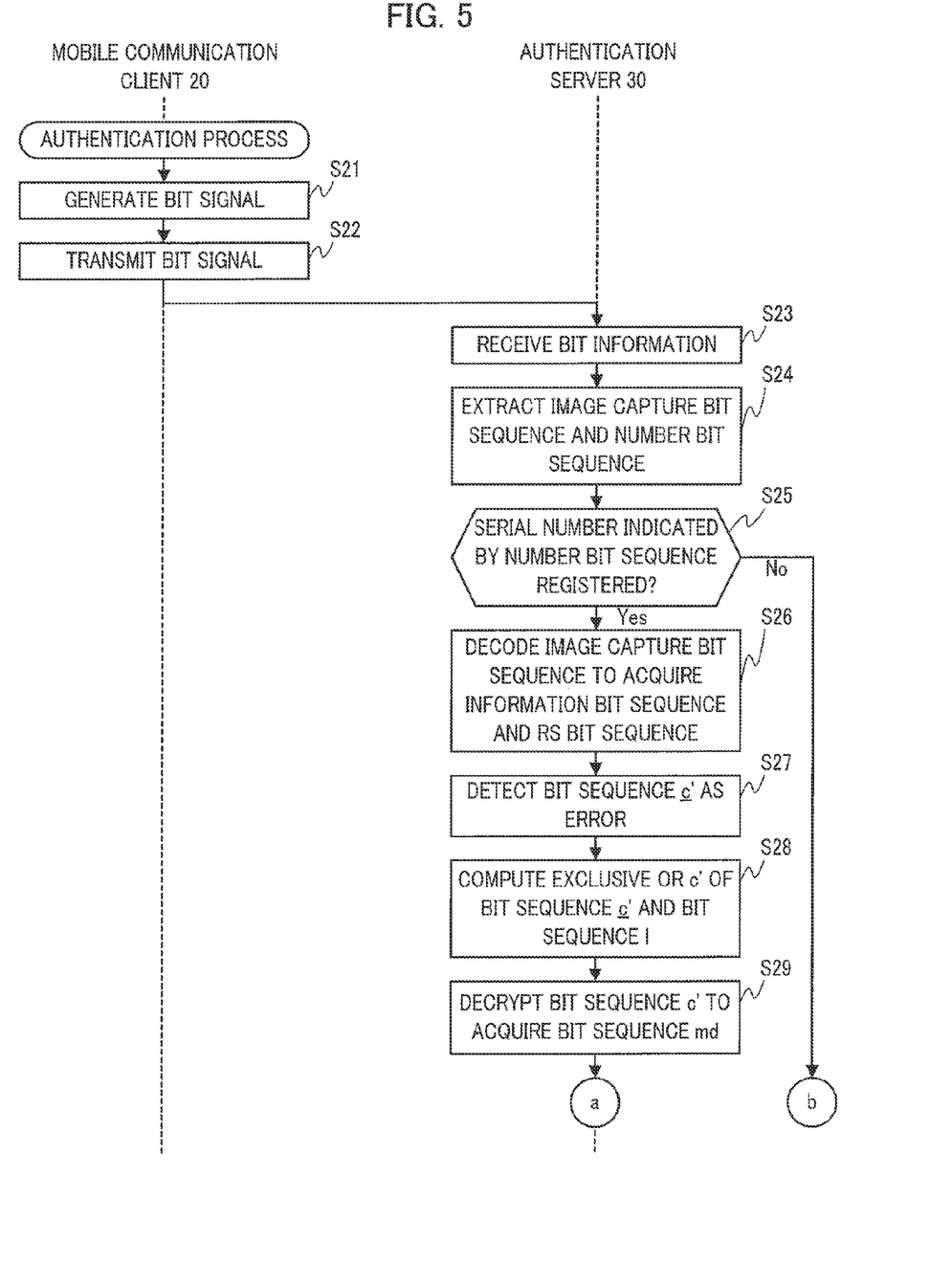
FIG. 5 is a flowchart illustrating details of an authentication process.
Figure 6:
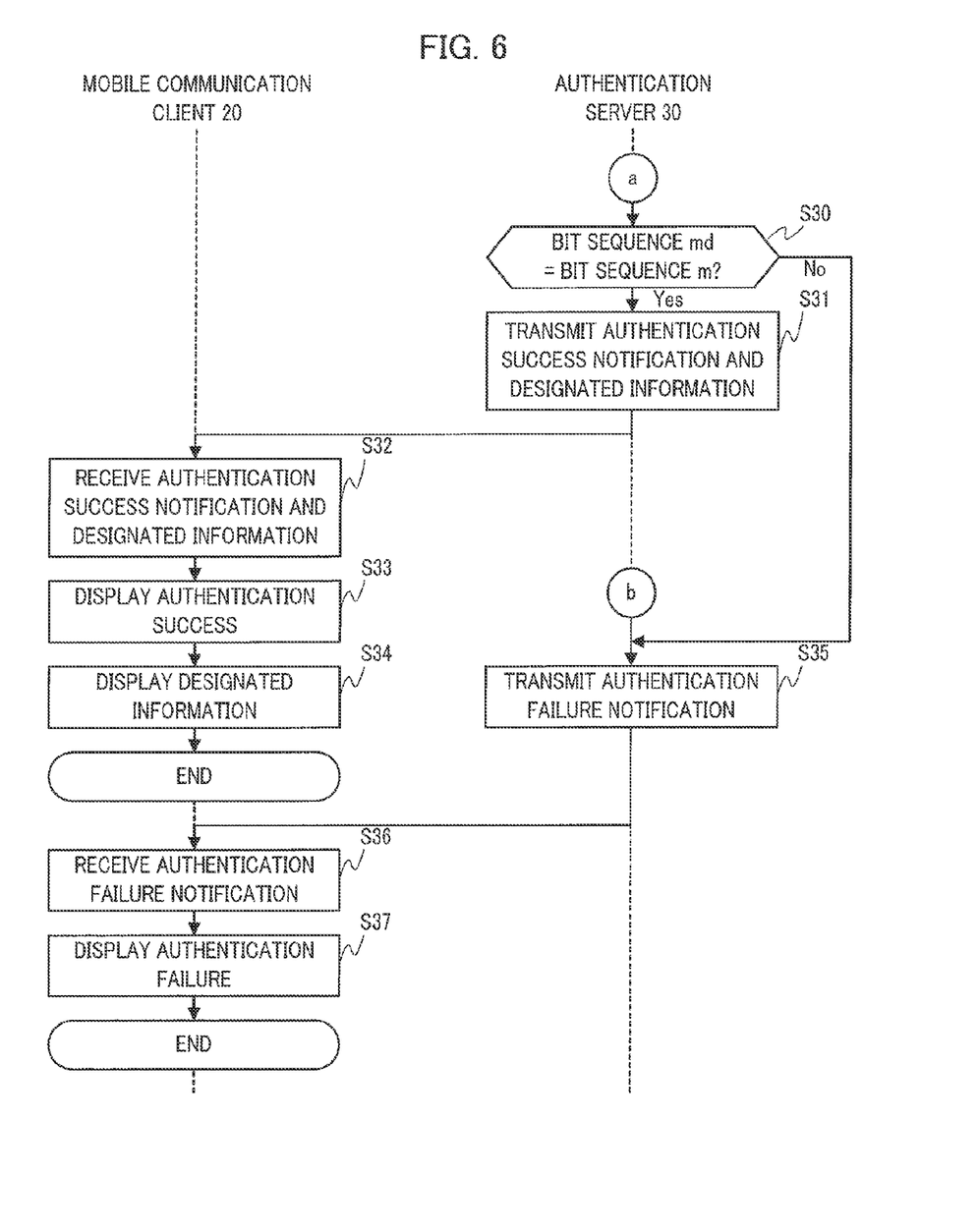
FIG. 6 is a flowchart illustrating details of an authentication process.

Next, FIGS. 4 to 6 will be referenced to describe a registration process performed in order to register a user's personal information and an authentication process performed in order to authenticate the mobile communication client 20 and the self-aware two-dimensional code 200 in the authentication system 1 configured in this way. FIG. 4 is a flowchart exemplifying a flow of the registration process in the authentication system according to the present embodiment. FIGS. 5 and 6 are flowcharts exemplifying a flow of the authentication process in the authentication system according to the present embodiment.

First, the registration process performed by the authentication system 1 will be described in detail using the flowchart illustrated in FIG. 4.

The mobile communication client 20 starts the registration process illustrated in FIG. 4 in response to instructions for downloading the authentication application program being given by a user via an operation on the operating interface 24.

In the registration process, the controller 21 first executes a download process, and downloads the authentication application program from the authentication server 30 via the network N (step S1), and additionally displays a personal information input screen on the display 25 (step S2).

After that, the controller 21 determines whether or not personal information has been input into the personal information input screen and instructions for transmitting to the authentication server 30 have been given by the user via operations on the operating interface 24 (step S3), and waits by looping (step S3; No) until determining that personal information has been input and transmission instructions have been given.

Subsequently, in the case of determining that personal information has been input and transmission instructions have been given (step S3; Yes), the controller 21 transmits the personal information that was input into the personal information input screen from the communication device 26 to the authentication server 30 via the network N (step S4).

Meanwhile, at the authentication server 30, in response to the communication device 33 receiving personal information transmitted from the mobile communication client 20 via the network N (step S5), the controller 31 assigns a serial number to the authentication application program downloaded by the mobile communication client 20 (step S6).

Subsequently, the controller 31 associates and stores the personal information received in step S5 and the serial number assigned in step S6 in the database 32a of the storage 32 (step S7), and additionally transmits the serial number assigned in step S6 from the communication device 33 to the mobile communication client 20 via the network N (step S8).

Meanwhile, at the mobile communication client 20, in response to the communication device 26 receiving the serial number transmitted from the authentication server 30 via the network N (step S9), the controller 21 executes an install process and installs the authentication program application downloaded in step S1 in the storage 23 (step S10), additionally stores the serial number received in step S9 in the storage 23 (step S11), and ends the registration process.

Next, the authentication process performed by the authentication system 1 will be described in detail using the flowchart illustrated in FIG. 5.

The mobile communication client 20 starts the authentication process illustrated in FIGS. 5 and 6 in response to the image capture device 22 capturing the self-aware two-dimensional code 200. In the authentication process, the controller 21 first generates a bit signal that includes an image capture bit sequence obtained as a result of the image capture device 22 capturing the self-aware two-dimensional code 200 and a number bit sequence indicating the serial number in the authentication application program being stored in the storage 23 (step S21 in FIG. 5), and transmits the generated bit signal from the communication device 26 to the authentication server 30 via the network N (step S22).

Meanwhile, at the authentication server 30, in response to the communication device 33 receiving the bit signal transmitted from the mobile communication client 20 via the network N (step S23), the controller 31 extracts the image capture bit sequence and the number bit sequence from the bit signal (step S24). Subsequently, the controller 31 conducts a user authentication by determining whether or not information matching the serial number indicated by the number bit sequence extracted in step S24 is registered in the database 32a (step S25).

In the case of determining that a matching serial number is registered as a result of the authentication (step S25; Yes), the controller 31 decodes the image capture bit sequence extracted in step S24 in accordance with the code placement rule discussed earlier, and thereby acquires an information bit sequence comprising 11 information symbols and an RS bit sequence comprising 22 or 23 RS symbols from each block of the self-aware two-dimensional code 200 (step S26).

Next, the controller 31 computes the exclusive OR of the image capture bit sequence versus the information bit sequence and RS bit sequence, and thereby detects a bit sequence c' comprising 24 RS symbols as error (step S27).

Subsequently, the controller 31 computes the exclusive OR of the bit sequence l included in the RS bit sequence and the bit sequence c' detected as error, and thereby acquires an embedded bit sequence c' as authentication information (step S28).

Also, the controller 31 decrypts the bit sequence c' using a decryption key corresponding to the encryption, and thereby acquires a bit sequence md (step S29).

Subsequently, the controller 31 determines whether or not the decrypted bit sequence md matches the bit sequence m included in the RS bit sequence, and thereby authenticates the self-aware two-dimensional code 200 (step S30 in FIG. 6).

In the case of obtaining an authentication result in which both bit sequences match as a result of the authentication (step S30; Yes), the controller 31 treats the user's personal information as registered and the self-aware two-dimensional code 200 as not falsified, and transmits, from the communication device 33 to the mobile communication client 20 via the network N, an authentication success notification indicating that the user and the self-aware two-dimensional code 200 were successfully authenticated, and additionally transmits designated information expressed by the information code Cd comprising a total of 44 information symbols that was acquired in step S26 (in the present embodiment, the URL of a product purchase site) (step S31).

Meanwhile, at the mobile communication client 20, in response to receiving an authentication success notification and designated information transmitted from the authentication server 30 via the network N (step S32), the controller 21 presents a display on the display 25 indicating that the mobile communication client 20 and the self-aware two-dimensional code 200 were successfully authenticated (step S33), and additionally displays the designated information (in the present embodiment, the URL of a product purchase site) on the display 25 to enable access to the purchase site (step S34).

In contrast, in the case of determining that a matching serial number is not registered as a result of the authentication (step S25; No), the controller 31 treats the user's personal information as not registered, and in addition, in the case of obtaining an authentication result in which both bit sequences match (step S30; No), the controller 31 treats the self-aware two-dimensional code 200 as falsified, and transmits, from the communication device 33 to the mobile communication client 20 via the network N, an authentication failure notification indicating that the user and/or the self-aware two-dimensional code 200 failed to authenticate (step S35).

Meanwhile, at the mobile communication client 20, in response to receiving an authentication failure notification transmitted from the authentication server 30 via the network N (step S36), the controller 21 presents a display on the display 25 indicating only that the user and/or the self-aware two-dimensional code 200 failed to authenticate (step S37).

As described above, in the authentication system 1 according to the present embodiment, the mobile communication client 20 transmits to the authentication server 30 a bit signal that includes an image capture bit sequence obtained by capturing an image of the self-aware two-dimensional code 200 with authentication information embedded in a correction area, and a number bit sequence that indicates a serial number of the authentication application program being stored in the storage 23. The authentication server 30 authenticates the user of the mobile communication client 20 and the self-aware two-dimensional code 200. Subsequently, the authentication server 30 transmits designated information expressed by the self-aware two-dimensional code 200 to the mobile communication client 20, on the condition that the user and the self-aware two-dimensional code 200 are successfully authenticated. Consequently, the mobile communication client 20 is able to acquire the designated information expressed by the self-aware two-dimensional code 200.

Herein, the self-aware two-dimensional code 200 is generated by acquiring a bit sequence $\underline{c}$ obtained by computing the exclusive OR between a bit sequence c encrypting a bit sequence m generated from part of an RS code Ce, and a bit sequence l generated from a part of the RS code Ce that is different from the above part, and by substituting the bit sequence l with the bit sequence $\underline{c}$, thereby embedding the bit sequence c into the RS code Ce as authentication information.

Consequently, in the case in which the self-aware two-dimensional code 200 is falsified, the authentication server 30 is no longer able to detect the exclusive OR of the bit sequence c and the bit sequence l as error, and thus is able to detect forgery of the self-aware two-dimensional code 200.

Also, by embedding authentication information into the RS code Ce, it is no longer necessary to in some way modify the information code Cd expressing the designated information, and thus it is possible to prevent a reduction in the data size of the information expressed by the self-aware two-dimensional code 200.

Furthermore, by embedding a bit sequence c encrypting a bit sequence m into the RS code Ce as authentication information, it is possible to more effectively prevent forgery of the self-aware two-dimensional code 200.

Also, the mobile communication client 20 does not decode and authenticate the self-aware two-dimensional code 200, but rather transmits a bit signal including an image capture bit sequence obtained by capturing an image of the self-aware two-dimensional code 200, and a number bit sequence that indicates the serial number of the authentication application program being stored in the storage 23. For this reason, devices other than the authentication server 30 are unable to decode the bit signal and acquire the designated information, and thus security may be increased.

Furthermore, the mobile communication client 20 is able to acquire the designated information expressed by the self-aware two-dimensional code 200 on the condition that the user and the self-aware two-dimensional code 200 are successfully authenticated on the authentication server 30, thus making it possible to prevent access to dangerous websites.

Also, to authenticate the user of the mobile communication client 20, the serial number of the authentication application assigned during the registration of the user's personal information is used, and since transmitting an Identity Document (ID), password or the like to the authentication server 30 is not necessary, it is possible to prevent divulging the ID, password or the like.

However, the present invention is not limited to the foregoing embodiment, and various modifications and applications are possible. Hereinafter, exemplary modifications of the foregoing embodiment that are applicable to the present invention will be described.

Although the foregoing embodiment describes an example of applying the authentication of the user and the self-aware two-dimensional code 200 when purchasing a product, the present invention is not limited thereto, and the application thereof is arbitrary, such as for requesting a certificate of residence, certificate of a seal impression or the like at a government office.

Although the foregoing embodiment describes the self-aware two-dimensional code 200 as expressing a product purchase site as the designated information, the present invention is not limited thereto. The information expressed by the self-aware two-dimensional code 200 is arbitrary, and may be any type of information, such as information indicating a request for a certificate of residence or a certificate of a seal impression at a government office.

The foregoing embodiment describes that, in the case in which the user and the self-aware two-dimensional code 200 are successfully authenticated, an indication thereof is displayed on the display 25, and in addition, the designated information expressed by the self-aware two-dimensional code 200 is displayed. However, the present invention is not limited thereto, and the display in the case of successfully authenticating the user and the self-aware two-dimensional code 200 is arbitrary. For example, a display indicating that the user and the self-aware two-dimensional code 200 were successfully authenticated may be presented, whereas the designated information expressed by the self-aware two-dimensional code 200 may not be displayed.

The foregoing embodiment describes authenticating both the user and the self-aware two-dimensional code 200, but the present invention is not limited thereto. For example, only the user may be authenticated, or only the self-aware two-dimensional code 20 may be authenticated.

The foregoing embodiment describes using the serial number of the authentication application program to authenticate the user, but the present invention is not limited thereto. The identification number used to authenticate the user is arbitrary, and may also be an individual identification number of the mobile communication client 20, for example.

The foregoing embodiment describes the serial number of the authentication application program as being assigned after the input of personal information, but before installing the authentication application program. However, the present invention is not limited thereto. The assignment timing of the serial number of the authentication application program is arbitrary, and the serial number may be assigned when downloading the authentication application program, or after installing the authentication application program.

The foregoing embodiment describes encrypting a bit sequence m to generate a bit sequence c, and computing the exclusive OR of the bit sequence c and the bit sequence l. However, the present invention is not limited thereto, and the exclusive OR of the bit sequence m and the bit sequence l may also be computed, without encrypting the bit sequence m. In this case, it is sufficient for the self-aware two-dimensional code 200 to respectively compute the exclusive OR of the bit sequences li and bit sequences mi obtained by dividing the bit sequence m into four to thereby generate bit sequences $\underline{mi}$, and by substituting the bit sequences li with the bit sequences $\underline{mi}$, thereby embedding the bit sequence m into the RS code Ce as authentication information.

Subsequently, at the authentication server 30, the controller 31 uses the RS bit sequence to detect a bit sequence $\underline{m}'$ as error. Next, the controller 31 computes the exclusive OR of the bit sequence l included in the RS bit sequence and the bit sequence $\underline{m}'$ detected as error to acquire a bit sequence m'. The self-aware two-dimensional code 200 may then be authenticated by determining whether or not the acquired bit sequence m' matches the bit sequence m included in the RS bit sequence.

The foregoing embodiment describes the two-dimensional code 100 and the self-aware two-dimensional code 200 as comprising cells of white color and cells of black color. However, the present invention is not limited thereto, and any expression is arbitrarily applicable insofar as designated information is expressed using one or multiple colors with optical characteristics recognized as "0", and one or multiple colors with optical characteristics recognized as "1", by a general-purpose two-dimensional code reader. For example, a combined logo/two-dimensional code in which a visible logotype is overlaid onto a two-dimensional code is also acceptable. For example, cells of at least a designated luminosity (a luminosity recognized as "1" by a general-purpose two-dimensional code reader) may be overlaid onto a logotype of less than the designated luminosity (a luminosity recognized as "0" by a general-purpose two-dimensional code reader), such that designated information is expressed by the distribution pattern of the cells and the parts of the logotype not overlaid with cells (see Unexamined Japanese Patent Application Kokai Publication No. 2007-287004, for example).

Alternatively, cell dots of less than the designated luminosity may be overlaid onto parts of a logotype with at least the designated luminosity, while cell dots of at least the designated luminosity may be overlaid onto parts of a logotype with less than the designated luminosity, such that designated information is expressed by the distribution patterns of the cell dots of at least the designated luminosity and the parts of the logotype with at least the designated luminosity, and the cell dots of less than the designated luminosity and the parts of the logotype with less than the designated luminosity (see Unexamined Japanese Patent Application Kokai Publication No. 2008-15642, for example). Note that the entirety of the specification, claims, and drawings of Unexamined Japanese Patent Application Kokai Publication No. 2007-287004 and Unexamined Japanese Patent Application Kokai Publication No. 2008-15642 are hereby incorporated by reference.

The foregoing embodiment is described by taking a QR Code (registered trademark) as an example of a two-dimensional code, but the present invention is not limited thereto. The two-dimensional code may also be another matrix-type two-dimensional code, such as a Data Matrix, Aztec Code, Code 1, ArrayTag, box figure code, MaxiCode, Vericode, Softstrip, CP Code, Calra Code or UltraCode. Alternatively, a stacked two-dimensional code in which one-dimensional barcodes are vertically stacked, such as PDF417, Code 49 or Code 16K, is also acceptable.

The foregoing embodiment describes a program executed by the CPU of the authentication server 30 as being stored in ROM or the like in advance, but the present invention is not limited thereto. By applying a program for causing execution of the processes discussed earlier to an existing general-purpose computer, the computer may be made to function as an authentication server 30 according to the foregoing embodiment.

The method of providing such a program is arbitrary. For example, such a program may be distributed by being stored on a computer-readable recording medium (such as a flexible disk, a Compact Disc-Read-Only Memory (CD-ROM) or a Digital Versatile Disc-ROM (DVD-ROM)), or the program may be stored in storage on a network such as the Internet, and be provided by being downloaded.

Furthermore, in the case of executing the above processes by distributed work between an OS and an application program or by the cooperative work of the OS and the application program, only the application program may be stored on a recording medium or in storage. Additionally, it is also possible for the program to be multiplexed onto a carrier wave and delivered via a network. For example, the above program may be posted on a Bulletin Board System (BBS) on a network, and the program may be delivered via the network. A configuration enabling the execution of the above processes is possible by subsequently launching and executing this program under control by the OS, similarly to another application program.

Note that various embodiments and modifications in accordance with the present invention are possible without departing from the scope and spirit of the present invention in a broad sense. Also, the foregoing embodiment is for the purpose of describing one working example of the present invention, and does not limit the scope of the present invention.

REFERENCE SIGNS LIST

1 Authentication system
10 Virtual vending machine
20 Mobile communication client
21 Controller
22 Image capture device
23 Storage
24 Operating interface
25 Display
26 Communication device
30 Authentication server
31 Controller
32 Storage
33 Communication device
100 Two-dimensional code
200 Self-aware two-dimensional code The invention is claimed as follow:

1. An authentication server connected via a network to a communication client that generates a bit signal by capturing an image of a two-dimensional code, the two-dimensional code being provided with an information area that expresses designated information with a cell distribution pattern, and a correction area that expresses correction information for correcting errors with a cell distribution pattern, wherein one part of the correction area is substituted with the exclusive OR of a first correction bit sequence generated from the one part, and a second correction bit sequence generated from a part different from the one part of the correction area, the authentication server comprising:
   bit signal receiving means that receives the bit signal transmitted from the communication client via the network;
   decoding means that decodes the bit signal received by the bit signal receiving means to acquire the designated information and the correction information;
   error detecting means that uses the correction information acquired by the decoding means to detect the exclusive OR of the first correction bit sequence and the second correction bit sequence as error;
   two-dimensional code authenticating means that authenticates the two-dimensional code by determining whether or not the exclusive OR of the first correction bit sequence included in the correction information and the error detected by the error detecting means matches the second correction bit sequence included in the correction information; and
   information transmitting means that, when the two-dimensional code authenticating means obtains an authentication result of both matching, transmits the designated information acquired by the decoding means to the communication client via the network.

2. The authentication server according to claim 1, wherein the bit signal receiving means receives the bit signal of the two-dimensional code having one part of the correction area substituted with the exclusive OR of the first correction bit sequence and an encrypted bit sequence obtained by encrypting the second correction bit sequence, and
   the two-dimensional code authenticating means authenticates the two-dimensional code by determining whether or not a decrypted bit sequence, obtained by decrypting the exclusive OR of the first correction bit sequence included in the correction information and the error detected by the error detecting means according to a scheme corresponding to the encryption, matches the second correction bit sequence included in the correction information.

3. The authentication server according to claim 2, wherein the bit signal receiving means receives the bit signal of the two-dimensional code having one part of the correction area substituted with the exclusive OR of the first correction bit sequence and an encrypted bit sequence obtained by encrypting the second correction bit sequence according to an asymmetrical encryption scheme, and
   the two-dimensional code authenticating means authenticates the two-dimensional code by determining whether or not a decrypted bit sequence, obtained by decrypting the exclusive OR of the first correction bit sequence included in the correction information and the error detected by the error detecting means according to a scheme corresponding to the asymmetrical encryption scheme, matches the second correction bit sequence included in the correction information.

4. The authentication server according to claim 3, wherein the bit signal receiving means receives the bit signal of the two-dimensional code having one part of the correction area substituted with the exclusive OR of the first correction bit sequence and an encrypted bit sequence obtained by encrypting the second correction bit sequence according to an elliptic curve encryption scheme, and
   the two-dimensional code authenticating means authenticates the two-dimensional code by determining whether or not a decrypted bit sequence, obtained by decrypting the exclusive OR of the first correction bit sequence included in the correction information and the error detected by the error detecting means according to a scheme corresponding to the elliptic curve encryption scheme, matches the second correction bit sequence included in the correction information.

5. The authentication server according to claim 1, further comprising:
   identification information registering means that registers identification information able to specify a user of the communication client; and
   user authenticating means that authenticates the user by determining whether or not the identification information registering means has registered a match with the identification information included in the bit signal and transmitted from the communication client;
   wherein the information transmitting means transmits the designated information acquired by the decoding means to the communication client via the network when the two-dimensional code authenticating means obtains an authentication result of both matching, and in addition the user authenticating means obtains an authentication result of identification information being registered.

6. An authentication system comprising:
   an authentication server connected via a network to a communication client that generates a bit signal by capturing an image of a two-dimensional code, the two-dimensional code being provided with an information area that expresses designated information with a cell distribution pattern, and a correction area that expresses correction information for correcting errors with a cell distribution pattern, wherein one part of the correction area is substituted with the exclusive OR of a first correction bit sequence generated from the one part, and a second correction bit sequence generated from a part different from the one part of the correction area, the authentication server comprising:
   bit signal receiving means that receives the bit signal transmitted from the communication client via the network;
   decoding means that decodes the bit signal received by the bit signal receiving means to acquire the designated information and the correction information;
   error detecting means that uses the correction information acquired by the decoding means to detect the exclusive OR of the first correction bit sequence and the second correction bit sequence as error;
   two-dimensional code authenticating means that authenticates the two-dimensional code by determining whether or not the exclusive OR of the first correction bit sequence included in the correction information and the error detected by the error detecting means matches the second correction bit sequence included in the correction information; and information transmitting means that, when the two-dimensional code authenticating means obtains an authentication result of both matching, transmits the designated information acquired by the decoding means to the communication client via the network; and the communication client connected to the authentication server via the network;

wherein the communication client includes bit signal generating means that generates the bit signal by capturing an image of the two-dimensional code, bit signal transmitting means that transmits the bit signal generated by the bit signal generating means to the authentication server via the network, and information receiving means that, by receiving the designated information transmitted by the information transmitting means, acquires the designated information expressed by the two-dimensional code.

7. An authentication method conducted by an authentication server connected via a network to a communication client that generates a bit signal by capturing an image of a two-dimensional code, the two-dimensional code being provided with an information area that expresses designated information with a cell distribution pattern, and a correction area that expresses correction information for correcting errors with a cell distribution pattern, wherein one part of the correction area is substituted with the exclusive OR of a first correction bit sequence generated from the one part, and a second correction bit sequence generated from a part different from the one part of the correction area, the authentication method comprising:

a bit signal receiving step that receives, in the authentication server, the bit signal transmitted from the communication client via the network;

a decoding step that decodes, via the authentication server, the bit signal received by the bit signal receiving step to acquire the designated information and the correction information;

an error detecting step that uses, via the authentication server, the correction information acquired by the decoding step to detect the exclusive OR of the first correction bit sequence and the second correction bit sequence as error;

a two-dimensional code authenticating step that authenticates, via the authentication server, the two-dimensional code by determining whether or not the exclusive OR of the first correction bit sequence included in the correction information and the error detected by the error detecting step matches the second correction bit sequence included in the correction information; and an information transmitting step that, when the two-dimensional code authenticating step obtains an authentication result of both matching, transmits, from the authentication server, the designated information acquired by the decoding step to the communication client via the network.

8. A system comprising an authentication server and a memory storing instructions, wherein the server is communicatively coupled to the memory and is also connected via a network to a communication client that generates a bit signal by capturing an image of a two-dimensional code, the two-dimensional code being provided with an information area that expresses designated information with a cell distribution pattern, and a correction area that expresses correction information for correcting errors with a cell distribution pattern, wherein one part of the correction area is substituted with the exclusive OR of a first correction bit sequence generated from the one part, and a second correction bit sequence generated from a part different from the one part of the correction area, the instructions, which when executed, cause the authentication server to:

receive the bit signal transmitted from the communication client via the network;

decode the bit signal received by the bit signal receiving procedure to acquire the designated information and the correction information;

use the correction information acquired by the decoding procedure to detect the exclusive OR of the first correction bit sequence and the second correction bit sequence as error;

authenticate the two-dimensional code by determining whether or not the exclusive OR of the first correction bit sequence included in the correction information and the error detected by the error detecting procedure matches the second correction bit sequence included in the correction information; and after obtaining an authentication result of both matching, transmit the designated information acquired by the decoding procedure to the communication client via the network.

* * * * *